US008804623B2

(12) United States Patent
Stacey et al.

(10) Patent No.: US 8,804,623 B2
(45) Date of Patent: *Aug. 12, 2014

(54) 802.11 VERY HIGH THROUGHPUT PREAMBLE SIGNALING FIELD WITH LEGACY COMPATIBILITY

(75) Inventors: Robert J. Stacey, Portland, OR (US); Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,006

(22) Filed: Jul. 5, 2012

(65) Prior Publication Data
US 2012/0275446 A1 Nov. 1, 2012

Related U.S. Application Data

(63) Continuation of application No. 12/644,475, filed on Dec. 22, 2009, now Pat. No. 8,238,316.

(51) Int. Cl.
*H04W 80/04* (2009.01)
*H04W 88/06* (2009.01)
(52) U.S. Cl.
USPC .......................................... 370/328; 370/392
(58) Field of Classification Search
CPC ...... H04W 80/04; H04W 88/06; H04L 45/00; H04L 47/10; H04L 29/0653
USPC .......................................... 370/328, 389, 392
See application file for complete search history.

(56) References Cited

U.S. PATENT DOCUMENTS

| 2010/0014489 A1* | 1/2010 | Qin et al. ...................... 370/336 |
| 2010/0046656 A1 | 2/2010 | Didier et al. |
| 2010/0086013 A1* | 4/2010 | Pare et al. ...................... 375/219 |
| 2010/0135268 A1* | 6/2010 | Seok .............................. 370/338 |
| 2010/0260159 A1 | 10/2010 | Zhang et al. |
| 2010/0309848 A1* | 12/2010 | Erceg et al. .................. 370/328 |
| 2010/0315952 A1* | 12/2010 | Pare et al. ...................... 370/241 |
| 2011/0110454 A1* | 5/2011 | Sampath et al. .............. 375/295 |
| 2011/0142020 A1* | 6/2011 | Kang et al. .................... 370/338 |

FOREIGN PATENT DOCUMENTS

WO 2006-120979 11/2006

OTHER PUBLICATIONS

Yung-Szu Tu et al., "Proposal for TGac VHT Format", IEEE 802.11-09/1258r0, Nov. 19, 2009, pp. 5-12.
Hongyuan Zhang et al., "802.11ac Preamble Discussions", IEEE 802.11 11-09/117r0, Nov. 16, 2009, pp. 3-6 and 10.
Leonard Lanante et al., "IEEE802.11ac Preamble with Legacy 802.11a/n Backward Compatibility", IEEE 802.11-09/0847r1, Nov. 18, 2009, pp. 5, 6, 13, and 14.
International Search Report and Written Opinion mailed Jul. 28, 2011, for PCT/US2010/056313.

(Continued)

*Primary Examiner* — Ronald Abelson
(74) *Attorney, Agent, or Firm* — John F. Travis

(57) ABSTRACT

In accordance with various aspects of the disclosure, a method and apparatus are disclosed that includes aspects of a controller configured to create a VHT frame that is arranged to include information relating to a modulation and a coding scheme with which a data portion of the VHT frame is modulated and encoded; and a transmitter configured to transmit the VHT frame to one or more STAs.

10 Claims, 6 Drawing Sheets

(56) References Cited

OTHER PUBLICATIONS

State Intellectual Property Office, P.R. China, Chinese Office Action, Patent Application No. 201010625162.6, mail date Sep. 27, 2013, a total of 23 pages.

Japanese Patent Office, Japanese Office Action, Application No. 2012-545953, mail date Oct. 8, 2013, total of 8 pages.

Yung-Szu Tu, Ralink Tech., Proposal for TGac VHT Format, IEEE 802.11-09/1258r0, IEEE, Nov. 9, 2009, pp. 1-12.

\* cited by examiner

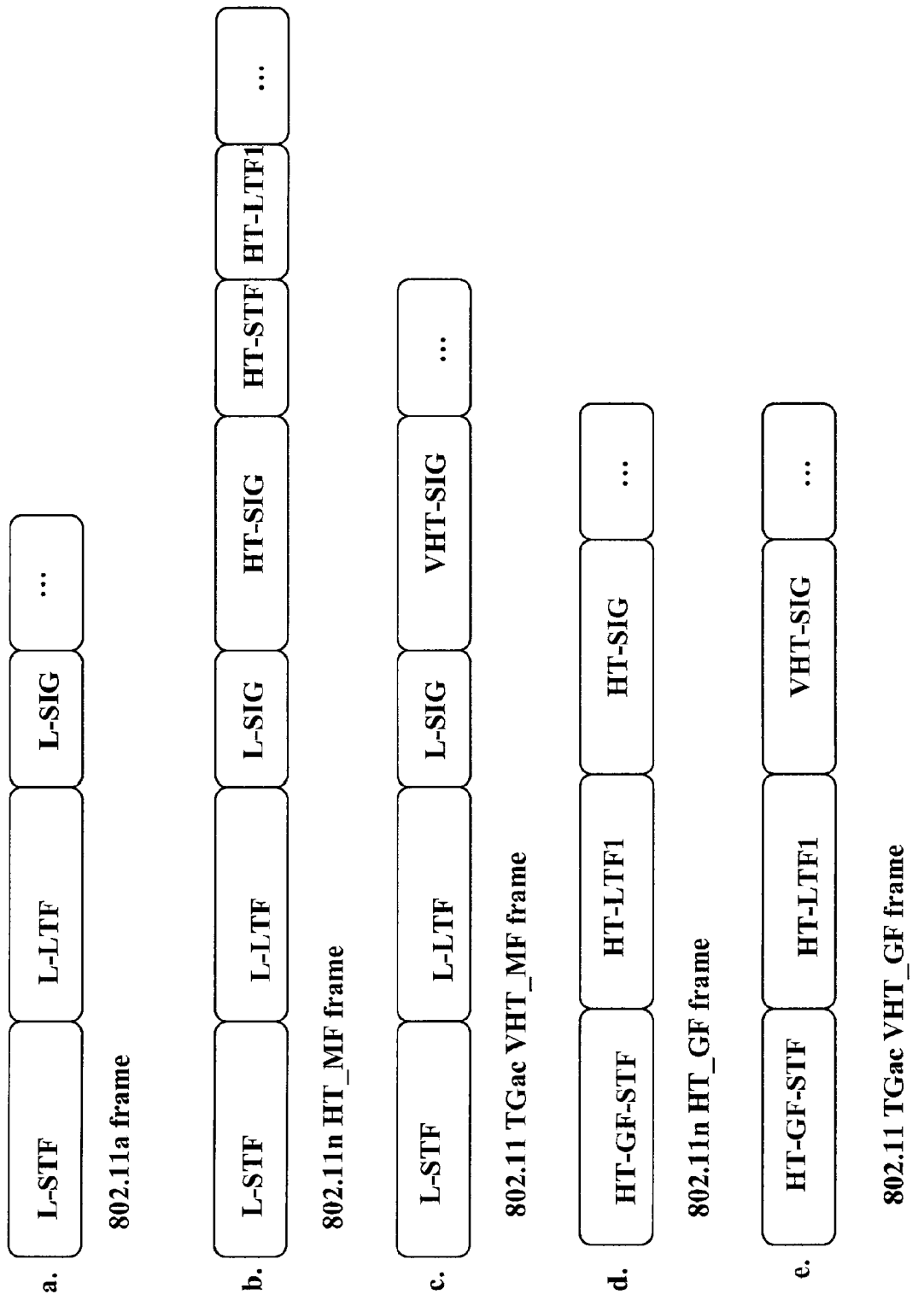

802.11 VERY HIGH THROUGHPUT PREAMBLE SIGNALING FIELD WITH LEGACY COMPATIBILITY

CROSS-REFERENCE TO RELATED APPLICATIONS

This application is a continuation of U.S. patent application Ser. No. 12/644,475 filed Dec. 22, 2009 now U.S. Pat. No. 8,238,316, the contents of which are hereby incorporated by reference in their entirety.

BACKGROUND

This disclosure relates generally to the field of wireless network communication, and in particular to a method and apparatus configured to provide a 802.11 very high throughput (VHT) preamble signaling field with legacy compatibility.

Wireless communication systems may operate in accordance with one or more protocol standards including, but not limited to, IEEE 802.11, Bluetooth, advanced mobile phone services (AMPS), digital AMPS, global system for mobile communications (GSM), code division multiple access (CDMA), local multi-point distribution systems(LMDS), multi-channel-multi-point distribution systems (MMDS), and the like. The applicable protocol for wireless communications standard may vary. As the IEEE 802.11 specification has evolved from IEEE 802.11 to IEEE 802.11b (standard 11b) to IEEE802.11a (standard 11a) and to IEEE 802.11g (standard 11g), wireless communication devices that are compliant with standard 11b may exist in the same wireless local area network (WLAN) as standard 11g compliant wireless communication devices.

When legacy devices such as those compliant with an earlier version of a standard reside in the same WLAN as devices compliant with later versions of the standard, mechanisms or processes may be employed for the legacy devices to know when the newer version devices are utilizing the wireless channel to avoid interference or a collision. A legacy system may be an existing system that is in place and available for use in wireless local area networks. The issue of legacy systems may be important because these systems may remain in place after new standards, methods or networks for future wire local area networks are implemented.

The different protocols or standards may operate within different frequency ranges, such as 5 to 6 gigahertz (GHz) or, alternatively, 2.4 GHz. For example, standard 11a may operate within the higher frequency range. An aspect of standard 11a is that portions of the spectrum, between 5 to 6 GHz, are allocated to a channel for wireless communications. The channel may be 20 megahertz (MHz) wide within the frequency band. Standard 11a also may use orthogonal frequency division multiplexing (OFDM). OFDM may be implemented over subcarriers that represent lines, or values, within the frequency domain of the 20 MHz channels. A signal may be transmitted over different subcarriers within the channel. The subcarriers may be orthogonal to each other so that information or data is extracted off each subcarrier about the signal.

Backward compatibility with legacy devices may be enabled at the physical (PHY) layer. At the PHY layer, backward compatibility is achieved by re-using the PHY preamble from a previous standard. Legacy devices may decode the preamble portion of all signals, which provides sufficient information for determining that the wireless channel is in use for a specific period of time, to avoid interference and collisions even though the legacy devices cannot fully demodulate or decode the transmitted frame(s).

As new standards or protocols are implemented, backward compatibility of receiving and transmitting signals may become more of a concern. New signaling formats may desire more robustness than legacy formats. Further, frames exchanged within a wireless system may include immediate acknowledgement capabilities, bursting information and exchanging more bits of information than frames used by legacy devices. It is desired to provide a very high throughput preamble signaling field that is compatible with legacy STAs.

BRIEF DESCRIPTION OF THE DRAWINGS

FIG. 3a shows a conventional 802.11a frame format.

FIG. 3b shows a conventional 802.11n HT_MF frame format.

FIG. 3c shows a 802.11 TGac VHT_MF frame format according to an aspect of the present disclosure.

FIG. 3d shows a conventional 802.11n HT_GF frame format.

FIG. 3e show a 802.11 TGac VHT_GF frame format according to an aspect of the present disclosure.

DETAILED DESCRIPTION

Figure 1:
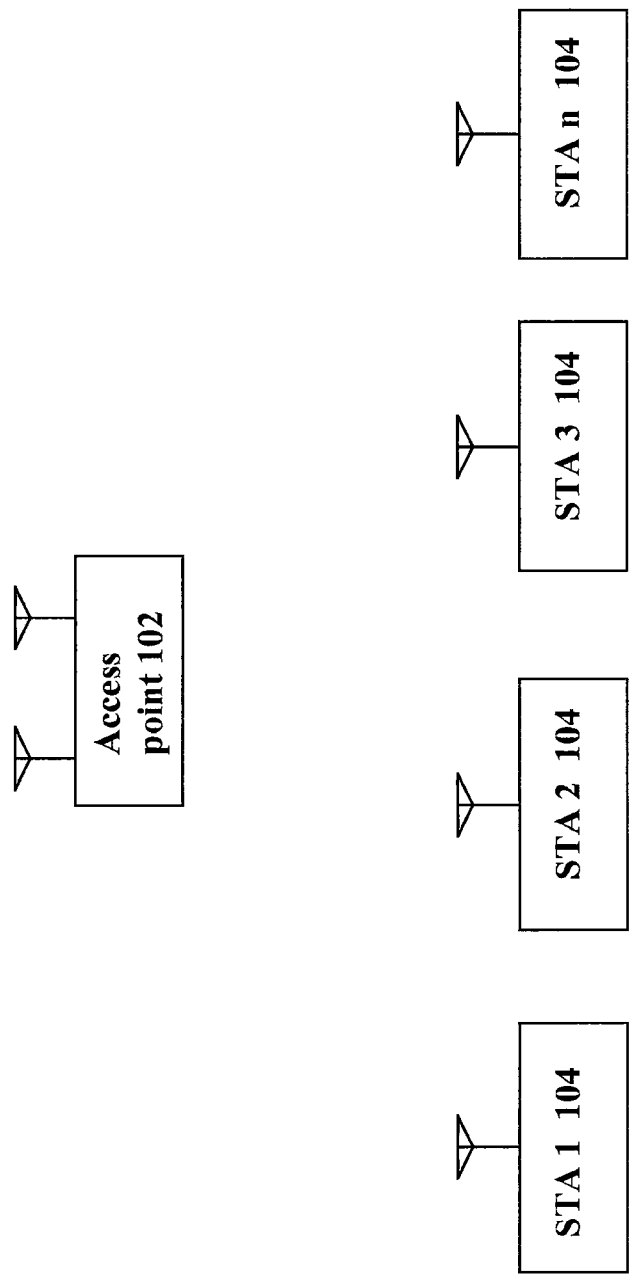
FIG. 1 shows an example diagram of a WLAN which includes wireless communication stations such as an access point (AP) and n STAs in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Definitions

Access Point (AP): Any entity that has a station (STA) functionality and provides access to the distribution services, via the wireless medium (WM) for associated STAs.

Greenfield format (GF): A frame format that is more efficient than mixed format but lacks features that would make it compatible with legacy devices.

High Throughput (HT): A station (STA) that conforms to the IEEE 802.11n standard.

Media Access Control (MAC): A Media Access Control (MAC) is a data communication protocol sub-layer, also known as the Medium Access Control, is a sublayer of the Data Link Layer specified in the seven-layer OSI model (layer 2).

Mixed format (MF): A frame format that is compatible with legacy devices, i.e., is useable in mixed environments where legacy devices are present.

Station (STA): Any device that contains an IEEE 802.11-conformant medium access control (MAC) and physical layer (PHY) interface to the wireless medium (WM).

Very High Throughput Station (VHT STA): A station (STA) that conforms to the expected IEEE 802.11ac standard.

Very High Throughput Mixed Format (VHT_MF): A mixed format frame that is compatible with both HT STAs and legacy STAs.

Very High Throughput Greenfield Format (VHT_GF): A Greenfield format that is not necessarily compatible with either HT STAs or legacy STAs.

Wireless medium (WM): The medium used to implement the transfer of protocol data units (PDUs) between peer physical layer (PHY) entities of a wireless local area network (LAN).

Description

In accordance with various embodiments of this disclosure, a method is disclosed that comprises creating a VHT frame that includes information relating to a modulation and a coding scheme with which a data portion of the VHT frame is modulated and encoded; and transmitting the VHT frame to one or more STAs. Moreover, an apparatus is disclosed that is arranged to perform the method, the apparatus including a controller that is configured to create the VHT frame and a transmitter that is configured to transmit the VHT frame to the one or more STAs. The apparatus can be configured to operate in a wireless environment including legacy STAs, HT STAs and TGac STAs.

In accordance with various embodiments of this disclosure, the VHT frame can be a mixed-format frame (MF) or a Greenfield format (GF) frame. The transmitted VHT frame can be a MF frame and includes a legacy compatible portion, wherein the legacy compatible portion includes information relating to a length of time for which a legacy STA or a HT STA will defer transmission on detecting the frame. The transmitted VHT MF frame can be configured to be detected as a VHT MF frame by a VHT STA and to be detected as a legacy frame by legacy STAs or HT STAs. The transmitted VHT MF frame can includes a VHT-SIG field that appears in the same place as the HT-SIG field of a HT MF frame, but for which a constellation rotation that would be applied to the HT-SIG field of an HT MF frame is not applied to the VHT-SIG field of the VHT frame. The transmitted VHT frame can be received at an HT STA as a legacy frame because the constellation rotation on the portion of the frame where the HT-SIG field would appear is not present, and wherein, as a result, the HT STA defers transmission based on a frame length indicated in the legacy compatible portion of the frame. In addition, the cyclic redundancy check (CRC) of the VHT-SIG field can be configured to appear invalid to HT STAs. The transmitted VHT MF frame would be detected by an HT STA as a legacy frame because of the invalid CRC and, as a result, the HT STA will defer transmission based on the frame length indicated in the legacy compatible portion of the frame.

In accordance with various embodiments of this disclosure, an apparatus is disclosed that comprises a receiver configured to receive a VHT MF frame which is arranged to be compatible with HT STAs and legacy STAs and include information relating to a modulation and an encoding scheme with which the data portion of the VHT MF frame is modulated and encoded; and a controller configured to process the received VHT MF frame. The VHT frame can be detected as not being an HT frame by virtue of the constellation rotation not being present on a VHT-SIG field of the received frame. The received frame can be detected as a VHT MF frame and not a legacy frame by detecting a valid CRC on a VHT-SIG field of the received frame.

In accordance with various embodiments of this disclosure, a method is disclosed that comprises receiving a VHT frame at a VHT STA; and determining if the received VHT frame is a mixed format frame or a Greenfield frame.

The method can include detecting if the received VHT frame includes a HT-GF-STF field; and demodulating and checking a CRC validity of a HT-SIG field if the received VHT frame included the HT-GF-STF field.

In accordance with various embodiments of this disclosure, a method is disclosed that comprises receiving a wireless frame at a VHT STA; and determining whether received wireless frame is a VHT frame, an HT frame or a legacy frame. Moreover, the method can include detecting if the received wireless frame includes a HT-GF-STF field; demodulating and checking a CRC validity of a VHT-SIG field if the received wireless frame included the HT-GF-STF field; and processing the received wireless frame as a VHT GF frame if the CRC is valid. Furthermore, the method can include detecting if the received wireless frame includes a L-SIG field; demodulating and checking a parity of the L-SIG field if the received wireless frame included the L-SIG field; and detecting a HT-SIG field by detecting a constellation rotation of the HT-SIG field; demodulating and checking a CRC validity of the HT-SIG; and processing the received wireless frame as a 802.11n HT_MF frame if the CRC is valid. Further, the method can include detecting if the received wireless frame includes a VHT-SIG field by demodulating and checking the CRC validity of a VHT-SIG field; processing the received wireless frame as a TGac VHT_MF frame if the CRC is valid; and processing the received wireless frame as a legacy frame if the CRC is invalid.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

In many wireless communication systems, a frame structure is used for data transmission between a transmitter and a receiver. For example, the IEEE 802.11 standard uses frame aggregation in a Media Access Control (MAC) layer and a physical (PHY) layer. In a typical wireless station such as a transmitter, a MAC layer inputs a MAC Service Data Unit (MSDU) from upper layers and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the transmitter to attach a PHY header thereto to construct a PHY Protocol Data Unit (PPDU) for transmission to another wireless station such as a receiver. The PHY header includes parameters for determining a transmission scheme including a coding/modulation scheme.

FIG. 1 shows an example diagram of an example WLAN system 300 which includes communication stations such as an AP 102 and n STAs 104 (STA1, . . . , STAn), according to an embodiment of the present invention. The STAs 104 can include TGac STAs, HT STAs and legacy STAs. The AP 102 provides central coordination.

A legacy frame and a legacy STA are a frame or a STA respectively that conform to 802.11a/g standard. An HT frame or HT STA are a frame or a STA respectively that conforms to the 802.11n standard. An HT STA is backwardly compatible with a legacy STA. A VHT frame and a VHT STA, in accordance to various aspects of the present disclosure, are a frame or a STA respectively that conforms to 802.11 standard being developed by the TGac task group within 802.11 working group. The VHT STA would be backward compatible with an HT STA and a legacy STA.

The IEEE 802.11n builds on previous 802.11 standards by adding multiple-input multiple-output (MIMO) and 40 MHz channels to the PHY (physical layer), and frame aggregation to the MAC layer. MIMO is a technology which uses multiple antennas to coherently resolve more information than possible using a single antenna.

Figure 2:
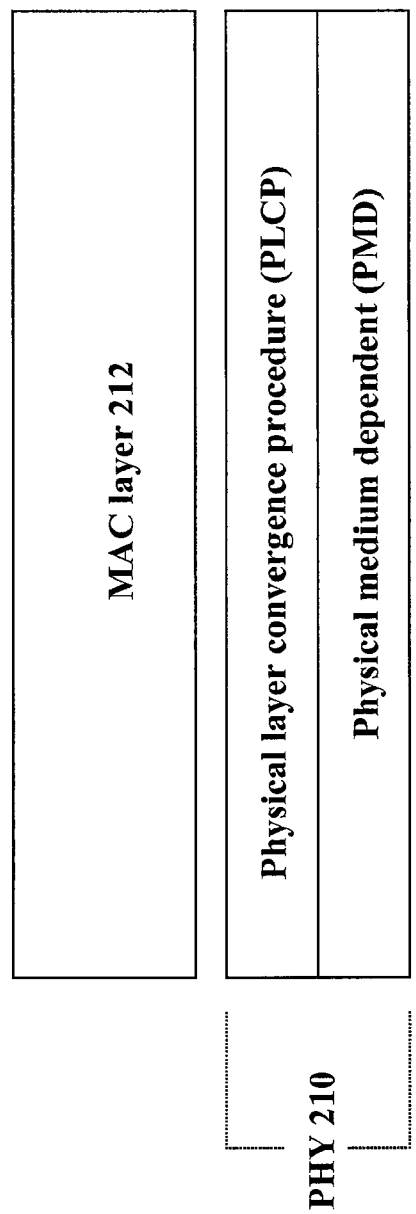
FIG. 2 shows an example protocol architecture for both the access point and the STAs in FIG. 1.
Figure 4A:
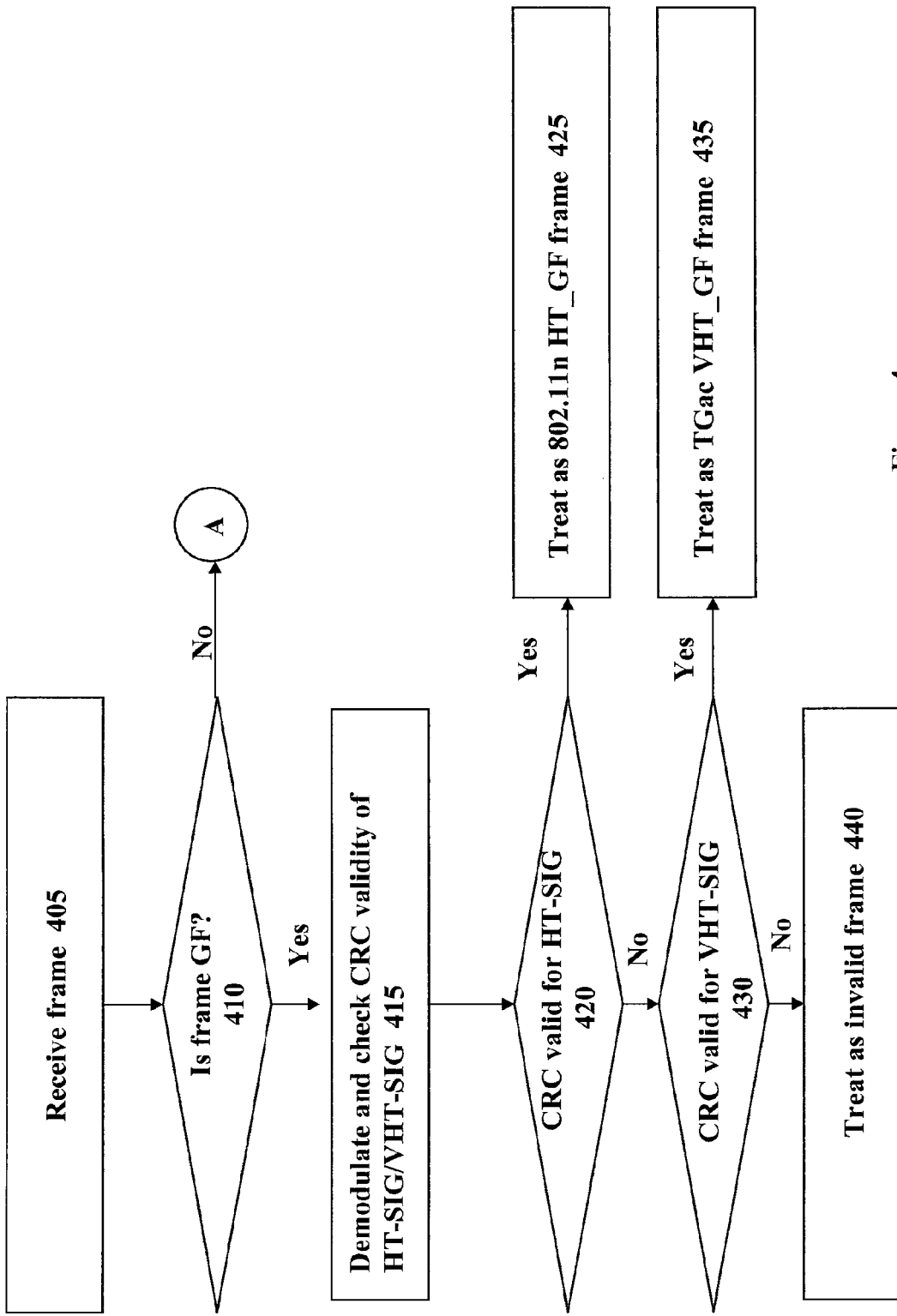
FIGS. 4a, 4b and 4c shows a PLCP receive procedure according to an aspect of the present disclosure.
Figure 4B:
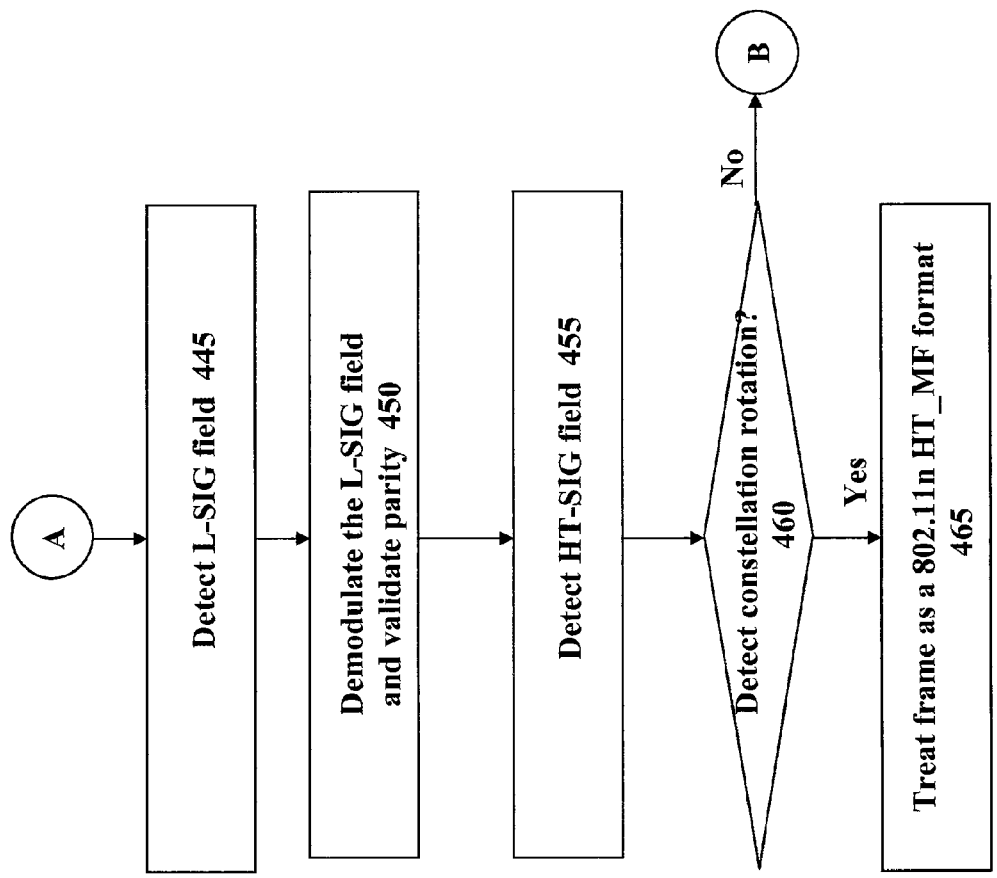
Figure 4C:
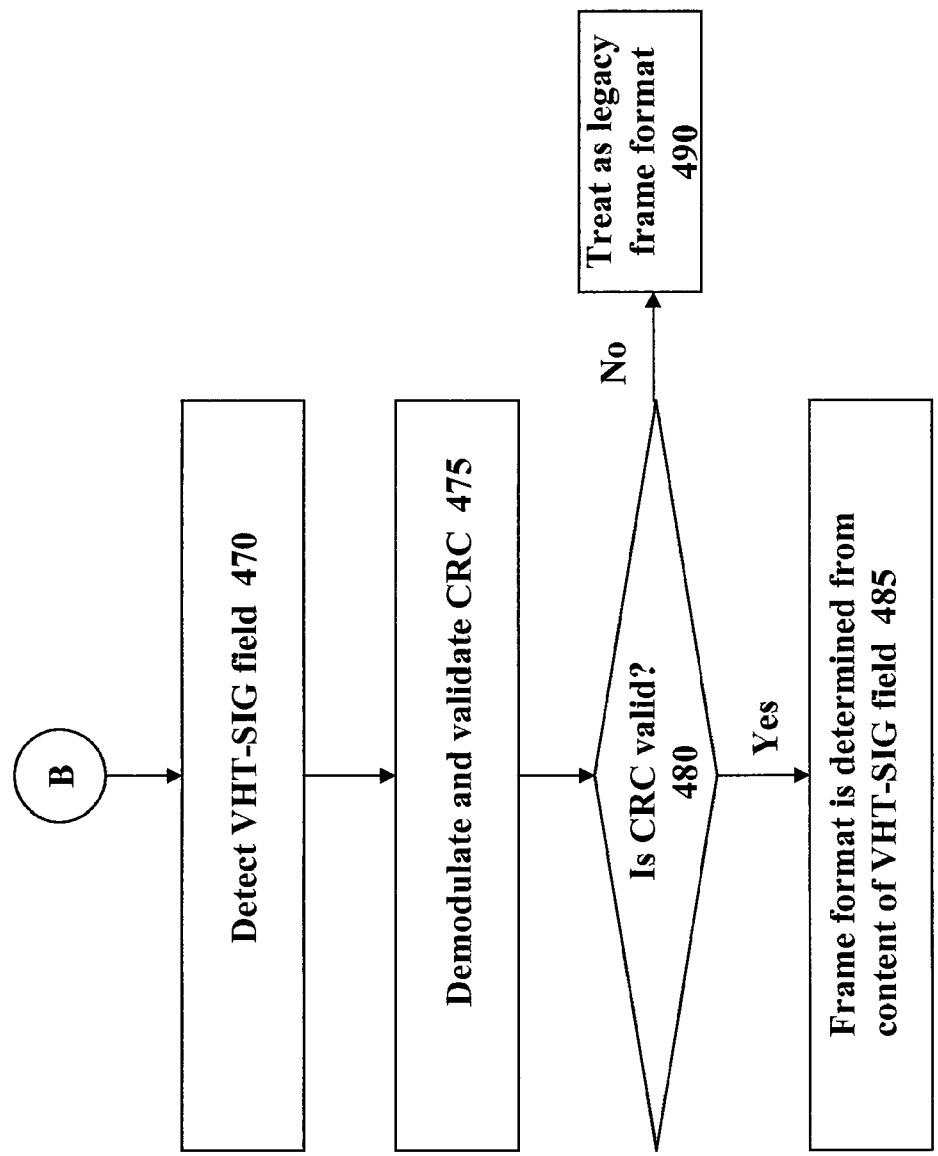

FIG. 2 shows an example protocol architecture for each STA 104. Each STA 104 implements a WLAN PHY layer 210 and a MAC layer 212. The PHY layer 210 includes two sub-layers: a physical layer convergence procedure (PLCP) sub-layer and a physical medium dependent (PMD) sub-layer. The MAC layer 212 constructs MAC packets from frames of data, and provides them to the PHY layer 210 for transmission over a shared wireless channel. Similarly, the AP 102 also includes a MAC layer and a PHY layer, as described.

In general, TGac devices are devices that can operate in 5 GHz frequency band. TGac devices can utilize a mode of operation that supports a throughput of at least 500 Mbps at the top of the MAC data service access point (MAC SAP) utilizing no more than 80 MHz of channel bandwidth in 5 GHz band or a mode of operation that supports an aggregate throughput of at least 1 Gbps at the top of the MAC data service access points (MAC SAPs) utilizing no more than 80 MHz of channel bandwidth in 5 GHz band. Typically, there is no restriction on the number of transmit or receive antennas being used on any devices. TGac devices are backward compatible with IEEE 802.11a devices operating in the 5 GHz frequency band and are backward compatible with IEEE 802.11n devices operating in the 5 GHz frequency band. TGac devices can be configured provide mechanisms to enable coexistence and spectrum sharing with IEEE802.11a/n devices operating in the same frequency band.

FIGS. 3a, 3b and 3d shows conventional 802.11a, 802.11n HT_MF, and 802.11n HT_GF frames, respectively. FIGS. 3c and 3e shows 802.11 TGac VHT_MF and 802.11 TGac HT_GF frames, respectively, in accordance with various aspects of the present disclosure. As shown in FIG. 3a, the conventional 802.11a frame consists of a preamble followed by a data payload. The preamble includes the legacy short training field (L-STF), legacy long training field (L-LTF) and legacy signal field (L-SIG). The data payload includes the service field, user data (PSDU), pad bits and tail bits.

In IEEE 802.11n WLAN communications, if legacy STAs and high-throughput stations (HT-STAs) coexist in the same WLAN, then frames of the HT-stations use a mixed mode PHY layer header which includes both a legacy PHY header part and a high-throughput (HT) PHY header part followed by the data payload. Legacy format frames can be successfully received by both the L-stations and the HT-stations. However, the legacy STAs cannot receive HT frames successfully because the L-stations cannot understand the HT PHY header part of the HT frames. As shown in FIG. 3b, the conventional 802.11n HT_MF frame includes legacy format frame in which a legacy PHY header part includes legacy training fields (L-TFs) and a legacy signal field (L-SIG). Further, an HT PHY header part includes an HT signal field (HT-SIG), HT short training fields (HT-STF) and HT long training fields (HT-LTF1). The one or more data fields can include service field, user data (PSDU), pad bits and tail bits.

In the Greenfield (GF) mode, high throughput (HT) packets are transmitted without a legacy-compatible part. As shown in FIG. 3d, the conventional 802.11n HT_GF frame includes a high-throughput (HT) PHY header part including signaling preamble fields followed by the data payload. The HT PHY header includes HT short training field (HT-GF-STF), HT long training field (HT-LTF1) and HT signaling field (HT-SIG). The data payload includes the service field, user data (PSDU), pad bits and tail bits.

FIGS. 3c and 3e shows 802.11 TGac VHT_MF and 802.11 TGac VHT_GF frames, respectively, in accordance with various aspects of the present disclosure. As shown in FIG. 3c, the 802.11 TGac VHT_MF frame includes a legacy PHY header part includes legacy short training field (L-STF), legacy long training field (L-LTF) and legacy signaling field (L-SIG) as shown and described in FIGS. 3a and 3b. A very high throughput (VHT) signaling field (VHT-SIG) follows the L-SIG field and appears in the same position as the HT-SIG field as shown and described in FIG. 3b followed by the data payload.

As shown in FIG. 3e, the 802.11 TGac VHT_GF frame includes a HT short training field (HT-GF-STF) and HT long training field (HT-LTF1). A very high throughput (VHT) signaling field (VHT-SIG) follows the HT-LTF1 field and appears in the same position as the HT-SIG field as shown and described in FIG. 3d followed by the data payload which can include a service field, user data (PSDU), pad bits and tail bits.

Turning again to FIG. 1, one of the STAs can be configured to create a VHT frame as shown in FIGS. 3c or FIG. 3e. The STAs can be equipped with one or more antennas that are arranged to transmit the VHT frame to one or more other STAs. The transmitting STA can be configured to operate in a wireless environment including legacy STAs, HT STAs, and TGac STAs.

As discussed above, the VHT frame can be a mixed-format frame as shown in FIG. 3c or a Greenfield format frame as shown in FIG. 3e. If the transmitted VHT frame is the mixed-format frame, then it can include a legacy compatible portion, wherein the legacy compatible portion includes information relating to a length of time for which a legacy STA and a HT STA will defer transmission. The transmitted VHT frame can be configured to be detected as a VHT frame by a VHT STA to be detected as a legacy frame by legacy STAs or HT STAs. The transmitted VHT frame can includes a VHT-SIG field that appears in the same place as the HT-SIG field of a HT frame, but for which a constellation rotation that would be applied to the HT-SIG field of an HT frame is not applied to the VHT-SIG field of the VHT frame.

The transmitted VHT frame can be received at an HT STA as a legacy frame because the constellation rotation on the portion of the frame where the HT-SIG field would appear is not present, and wherein, as a result, the HT STA defers transmission based on a frame length indicated in the legacy compatible portion of the frame. In addition, the cyclic redundancy check (CRC) of the VHT-SIG field can be configured to appear invalid to the HT STAs. The transmitted VHT frame would be received at an HT STA as a legacy frame because of the lack of constellation rotation and invalid CRC, and wherein, as a result, the HT STA will defer transmission based on a frame length indicated in the legacy compatible portion of the frame.

In some aspects, the VHT-SIG field can have the constellation rotation defined for the VHT-SIG field, but not to be performed for TGac PHY formats. The VHT-SIG can be modulated using the same binary phase shift keying (BPSK) rate 1/2 MCS (modulation and coding scheme) used on the legacy SIG symbol and the VHT-SIG CRC definition can be changed from that used for 802.11n frames so that the CRC will appear invalid to an 802.11n device. The VHT SIG CRC definition can be changed through one or more of the following techniques: use a different polynomial, use a different initialization value, perform a simple transform (such as inversion), include additional bits in the CRC calculation (e.g., from the L-SIG field), use a different length CRC. This will allow that an 802.11n STA will treat the VHT frame as a legacy 802.11a frame and defer transmission based on the frame length indicated in the legacy SIG field.

Figured 4a, 4b and 4c show a PLCP receive procedure for a VHT STA in accordance with various aspects of the present disclosure. A frame is received at 405. At 410, a determination is made as to whether the received frame is a Greenfield format frame by checking to see if an HT-GF-STF is received. If the result of the determination at 410 is a yes, then the HT-SIG/VHT-SIG field is demodulated and the CRC validity checked at 415. If the CRC is determined to be valid for an HT-SIG field at 420, then the frame is determined to be an HT_GF frame and treated as such at 425. If the CRC is determined to be valid for an VHT-SIG field at 430, then the frame is determined to be an TGac VHT_GF frame and treated as such at 435. Otherwise, the received frame is treated as an invalid frame at 440.

If the result of the determination at 410 is no, then the frame is detected for a L-SIG field at 445. The L-SIG field is demodulated and the parity of the L-SIG field is validated at 450. The presence of a valid L-SIG field alone does not indicate that the frame is a legacy 802.11a frame. At 455, a determination is made as to whether a HT-SIG field is detected. If the constellation rotation is detected at 460, then the frame format is treated as a 802.11n HT_MF frame 465. The HT-SIG field is then demodulated and checked for validity of the CRC on the HT-SIG field.

If the constellation rotation is not detected at 460, then a VHT-SIG field is detected at 470 by demodulating non-rotated BPSK constellation and validity CRC at 475. If the CRC is determined to be valid at 480, then the frame format is determined from the content of the VHT-SIG field at 485. If the CRC is determined not be valid at 480, then the frame is treated as a legacy frame format at 490.

In some aspects, for a VHT format frame, a legacy 802.11a device will fail the Green field 802.11n frame check (CRC). Moreover, a legacy 802.11a device will look for and defer transmission based on the content of the L-SIG field. A legacy 802.11n device will look for an HT-SIG field. In some aspects, the legacy devices can look for the constellation rotation only. In some aspects, the legacy devices can look for the constellation rotation and valid CRC, and in some aspects, the legacy devices can just look for a valid CRC. In these instances, since neither the constellation rotation nor the valid CRC are present, these legacy devices will defer transmission based on the L-SIG content.

In some aspects, for the VHT-SIG CRC, there are various options that will ensure that the CRC is determined to be invalid by a legacy 802.11n device. The CRC may use a different polynomial to the 802.11n HT-SIG CRC. The CRC may use the same polynomial, but a different initialization value to that used in the 802.11n HT-SIG CRC. The CRC may use the same polynomial and initialization value and perform a simple transform (such as inversion) before insertion in the VHT-SIG. A simple transformation (such as inversion) may be performed on other bits in the VHT-SIG after computation of the CRC. The CRC may use the same polynomial and initialization value but cover additional bits, such as the L-SIG field plus VHT-SIG field. The CRC may be a new CRC of different length than the 802.11n HT-SIG CRC with any polynomial.

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is being claimed:

1. An apparatus comprising:
a wireless communications controller configured to create a frame that is arranged to include information indicating a modulation and coding scheme with which a data portion of the frame is modulated and encoded; and
a transmitter configured to transmit the frame to one or more STAs,
wherein the frame is to have a legacy training field followed by a VHT signal field;
wherein the frame is a Greenfield format frame.

2. A method comprising:
creating a frame that is arranged to include information indicating a modulation and coding scheme with which a data portion of the frame is modulated and encoded; and
transmitting the frame to one or more STAs,
wherein the frame is to have a legacy training field followed by a VHT signal field;
wherein the frame is a Greenfield format frame.

3. An apparatus comprising:
a wireless communications controller configured to create a frame that is arranged to include information indicating a modulation and coding scheme with which a data portion of the frame is modulated and encoded; and
a transmitter configured to transmit the frame to one or more STAs,
wherein the frame is to have a VHT signal field which follows an HT training field.

4. The apparatus of claim 3, wherein the frame is a Greenfield format frame.

5. The apparatus of claim 3, wherein the HT training field comprises an HT long training field.

6. The apparatus of claim 3, wherein the HT training field comprises an HT short training field.

7. An apparatus comprising:
a receiver configured to receive a wireless frame comprising an HT training field and a VHT signal field following the HT training field; and
a controller configured to check CRC validity of the VHT-SIG field to process the received wireless frame as a VHT Greenfield format frame.

8. The apparatus of claim 7, wherein the HT training field comprises an HT long training field or an HT short training field.

9. An apparatus comprising:
a receiver configured to receive a wireless frame comprising a legacy signal field followed by a VHT signal field; and
a controller configured to check constellation rotation and CRC validity of the VHT-SIG field to process the received wireless frame as a VHT mixed-format frame.

10. The apparatus of claim 9, wherein the controller is configured to check whether the VHT-SIG field lacks constellation rotation to process the received wireless frame as a VHT mixed-format frame.

* * * * *